United States Patent
Shih

(10) Patent No.: US 9,069,400 B2
(45) Date of Patent: Jun. 30, 2015

(54) TOUCH DISPLAY PANEL

(71) Applicant: Au Optronics Corporation, Hsinchu (TW)

(72) Inventor: Li-Wei Shih, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 240 days.

(21) Appl. No.: 13/710,466

(22) Filed: Dec. 11, 2012

(65) Prior Publication Data

US 2013/0169567 A1    Jul. 4, 2013

(30) Foreign Application Priority Data

Dec. 30, 2011    (TW) .............................. 100150089 A

(51) Int. Cl.
  *G09G 3/00* (2006.01)
  *G06F 3/041* (2006.01)
(52) U.S. Cl.
  CPC .............. *G06F 3/041* (2013.01); *G06F 3/0412* (2013.01)
(58) Field of Classification Search
  CPC ....................................................... G06F 3/041
  USPC .................................................. 345/173, 174
  See application file for complete search history.

(56) References Cited

U.S. PATENT DOCUMENTS

| | | | | |
|---|---|---|---|---|
| 8,599,149 | B2 * | 12/2013 | Lee et al. ........................ | 345/173 |
| 2008/0296073 | A1 * | 12/2008 | McDermid ................. | 178/18.05 |
| 2009/0278805 | A1 * | 11/2009 | Kao et al. ........................ | 345/173 |
| 2010/0123681 | A1 * | 5/2010 | Wu et al. ........................ | 345/174 |

FOREIGN PATENT DOCUMENTS

| | | |
|---|---|---|
| CN | 101308415 | 11/2008 |
| CN | 101571635 | 11/2009 |
| CN | 101719037 | 6/2010 |
| TW | 201140388 | 11/2011 |

OTHER PUBLICATIONS

"Office Action of China Counterpart Application", issued on May 29, 2014, p. 1-p. 8.

* cited by examiner

*Primary Examiner* — Amare Mengistu
*Assistant Examiner* — Joseph G Rodriguez
(74) *Attorney, Agent, or Firm* — Jianq Chyun IP Office

(57) ABSTRACT

A touch display panel includes a first substrate, a pixel array on the first substrate in a display region, first lead lines located on the first substrate in a non-display region and electrically connected to the pixel array, a second substrate disposed opposite to the first substrate, a display medium layer between the first and second substrates, a touch device layer disposed on the second substrate and having a portion in a first touch region within the display region and the other portion in a second touch region within the non-display region, and second lead lines located on the second substrate and electrically connected to the touch device layer. The material of the touch device layer in the first and second touch regions is the same. The second lead lines extend from the first touch region to an edge of the second substrate through the second touch region.

8 Claims, 8 Drawing Sheets

TP1

TOUCH DISPLAY PANEL

CROSS-REFERENCE TO RELATED APPLICATION

This application claims the priority benefit of Taiwan application serial no. 100150089, filed on Dec. 30, 2011. The entirety of the above-mentioned patent application is hereby incorporated by reference herein and made a part of this specification.

BACKGROUND OF THE INVENTION

1. Field of the Invention

The invention relates to a touch display panel.

2. Description of Related Art

A touch display panel includes a display panel and a touch panel, and the touch panel can be built in the display panel or attached to the display panel. According to different sensing principles, touch panels may be categorized into resistant touch panels, capacitive touch panels, optical touch panels, sonic wave touch panels, and electromagnetic touch panels. Among the touch panels, the capacitive touch panels characterized by fast response speed, favorable reliability, and durability have been extensively applied in electronic devices.

The layout of peripheral circuits of the touch panel and peripheral circuits of the display panel is normally determined based on the location of the circuit board and the positional relation between components on the upper and lower substrates. Hence, the overall circuit layout of the conventional touch display panel often results in massive waste of space in the panel and thus impedes the design of the touch panel.

SUMMARY OF THE INVENTION

The invention is directed to a touch display panel capable of resolving issues arising from peripheral circuit layout of a conventional touch display panel.

In an embodiment of the invention, a touch display panel that has a display region and a non-display region is provided. The touch display panel includes a first substrate, a pixel array, a plurality of first lead lines, a second substrate, a display medium layer, a touch device layer, and a plurality of second lead lines. The pixel array is located on the first substrate and in the display region. The first lead lines are located on the first substrate and in the non-display region. Here, the first lead lines are electrically connected to the pixel array. The second substrate is located opposite to the first substrate. The display medium layer is located between the first substrate and the second substrate. The touch device layer is located on the second substrate. Here, the touch device layer has a portion in a first touch region within the display region and the other portion in a second touch region within the non-display region. The touch device layer in the first and second touch regions is made of the same material. The second lead lines are located on the second substrate and electrically connected to the touch device layer, and the second lead lines extend from the first touch region to an edge of the second substrate through the second touch region.

Based on the above, the touch device layer includes the portion in the first touch region within the display region and the other portion in the second touch region within the non-display region, and the touch device layer in the first and second touch regions is made of the same material. That is, in an embodiment of the invention, the touch device layer is located in the non-display region where no touch device is supposed to be placed according to the related art, such that touch keys for performing certain functions can be configured in the non-display region where the touch device layer is located according to an embodiment of the invention. As a consequence, the problem of waste of space in the conventional touch display panel can be resolved, and the functions of the touch display panel described herein may be expanded in comparison with the functions of the conventional touch display panel.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1:
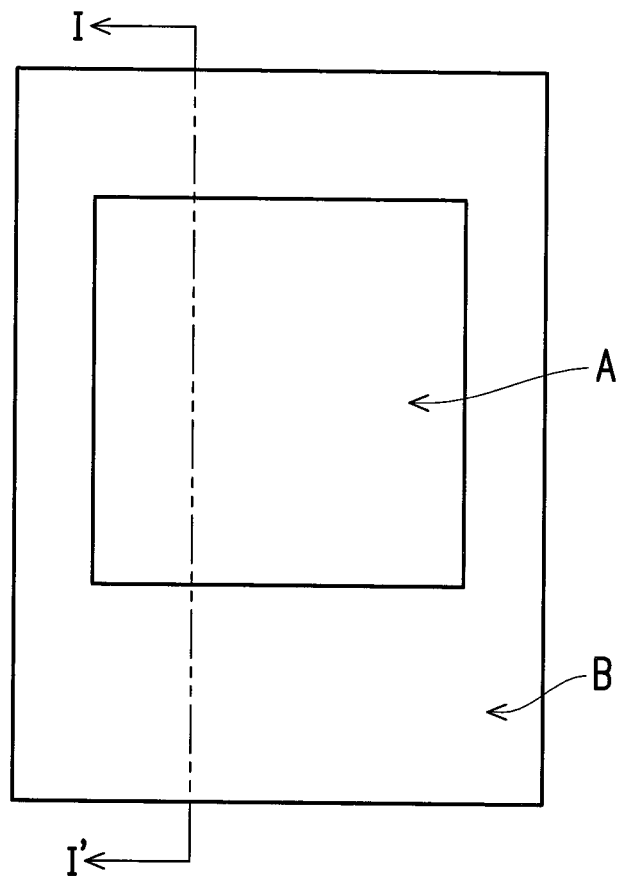
FIG. 1 is a schematic top view illustrating a touch display panel according to an embodiment of the invention.
Figure 2:
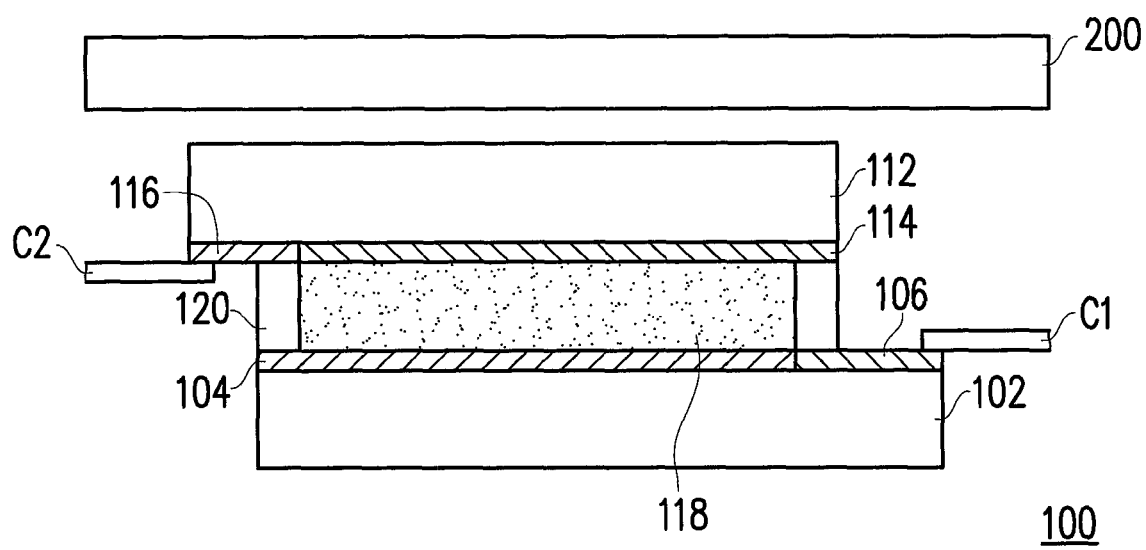
FIG. 2 is a schematic cross-sectional view illustrating the touch display panel depicted in FIG. 1, and the cross-sectional view is taken along a section line I-I'.

FIG. 1 is a schematic top view illustrating a touch display panel according to an embodiment of the invention. FIG. 2 is a schematic cross-sectional view illustrating the touch display panel depicted in FIG. 1, and the cross-sectional view is taken along a section line I-I'. With reference to FIG. 1 and FIG. 2, the touch display panel 100 described in the present embodiment has a display region A and a non-display region B, and the touch display panel 100 includes a first substrate 102, a pixel array 104, a plurality of first lead lines 106, a second substrate 112, a display medium layer 118, a touch device layer 114, and a plurality of second lead lines 116. According to the present embodiment, the touch display panel 100 may further include a covering substrate 200, a first circuit board C1, and a second circuit board C2.

The first substrate 102 may be made of glass, quartz, an organic polymer, an opaque/reflective material (such as a conductive material, metal, wafer, ceramics, or any other appropriate material), any of the above-mentioned materials with flexibility, or any other appropriate material.

Figure 3:
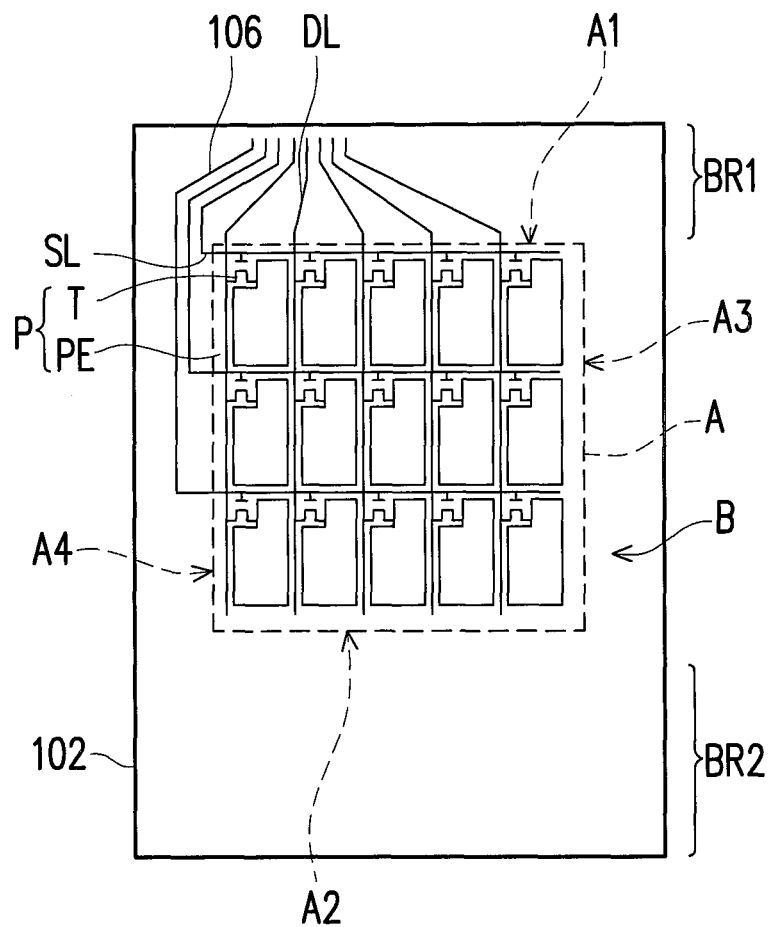
FIG. 3 is a schematic view illustrating components on a first substrate of a touch display panel according to an embodiment of the invention.

The pixel array 104 is located on the first substrate 102 and in the display region A. According to the present embodiment, the pixel array 104 includes a plurality of scan lines SL, a plurality of data lines DL, and a plurality of pixel structures P electrically connected to the scan lines SL and the data lines DL, as illustrated in FIG. 3. Each of the pixel structures P includes an active device T and a pixel electrode PE electrically connected to the active device T. The device design of the pixel structures P in the pixel array 104 is relevant to the type of the display panel. For instance, in the present embodiment, the touch display panel is a liquid crystal display (LCD) panel with the touch sensing function, and each pixel structure P not only includes a thin film transistor (TFT) T and the pixel electrode PE connected to the TFT but also comprises a storage capacitor. Here, the liquid crystal material of the LCD panel includes a liquid crystal material which may be twisted by a horizontal electric field, a liquid crystal material which may be twisted by a vertical electric field, a cholesteric liquid crystal material, a blue-phase liquid crystal material, any other appropriate material, or a combination thereof. In another embodiment of the invention, given that the touch display panel is an organic electroluminescent display panel with the touch sensing function, each pixel structure may include a switch TFT, a driver TFT, a storage TFT, and a pixel electrode (i.e., cathode or anode) connected to the driver TFT. Certainly, other display panels are applicable according to embodiments of the invention, e.g., electronic paper, an electrowetting display panel, an inorganic electroluminescent panel, any other appropriate panel, or a combination thereof.

The first lead lines 106 are located on the first substrate 102 and in the non-display region B. Here, the first lead lines 106 are electrically connected to the pixel array 104. To be more specific, in the present embodiment, parts of the first lead lines 106 are electrically connected to the scan lines SL, and the other parts of the first lead lines 106 are electrically connected to the data lines DL. An end of each first lead line 106 extends to an edge of the first substrate 100 and is electrically connected to the first circuit board C1. According to the present embodiment, a driving chip or a driving device may be further disposed between the first lead lines 106 and the first circuit board C1, i.e., the first lead lines 106 are electrically connected to the first circuit board C1 through a driving chip or a driving device. Namely, a driving chip or a driving device may be selectively disposed on the first substrate 102 or on the first circuit board C1.

The second substrate 112 is located opposite to the first substrate 102. Here, the second substrate 112 may be made of a transparent material, such as glass, quartz, an organic polymer, any of the above-mentioned materials which is thinned out, any of the above-mentioned materials with flexibility, or any other appropriate material.

Figure 4:
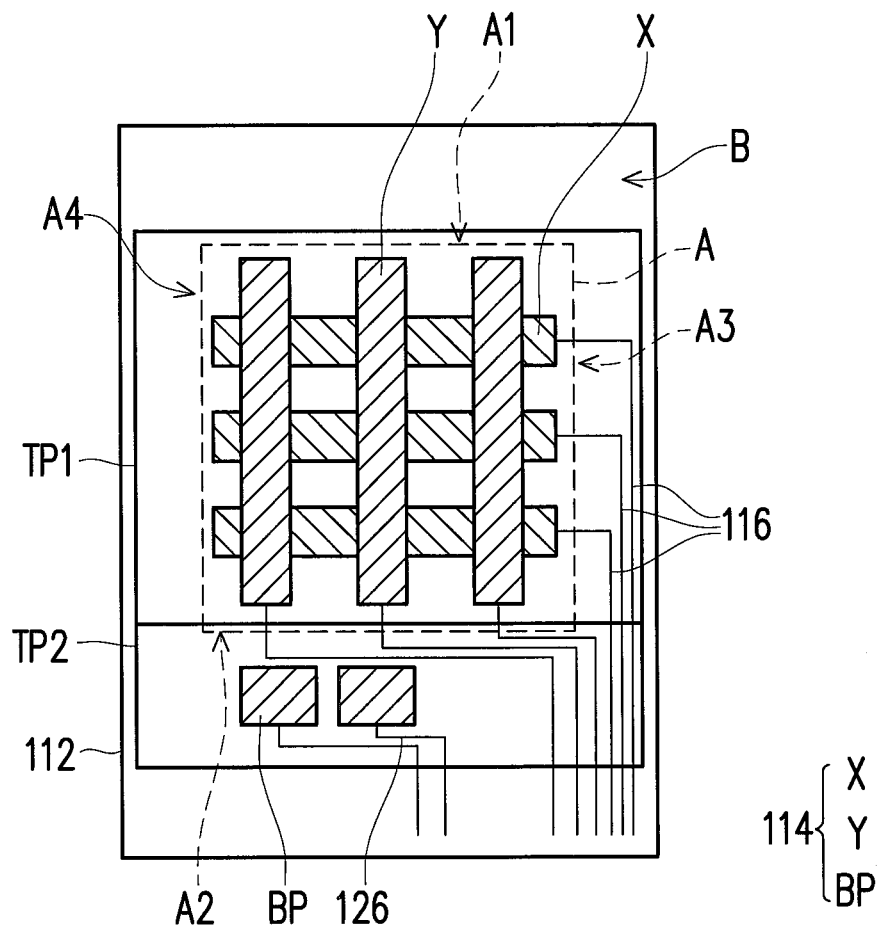
FIG. 4 is a schematic view illustrating components on a second substrate of a touch display panel according to an embodiment of the invention.

The touch device layer 114 is located on the second substrate 112. As indicated in FIG. 4, the touch device layer 114 described herein includes a portion located in the first touch region TP1 within the display region A and the other portion located in the second touch region TP2 within the non-display region B. Specifically, the touch device layer 114 in the first touch region TP1 is made of substantially the same material as that of the touch device layer 114 in the second touch region TP2.

Figure 7:
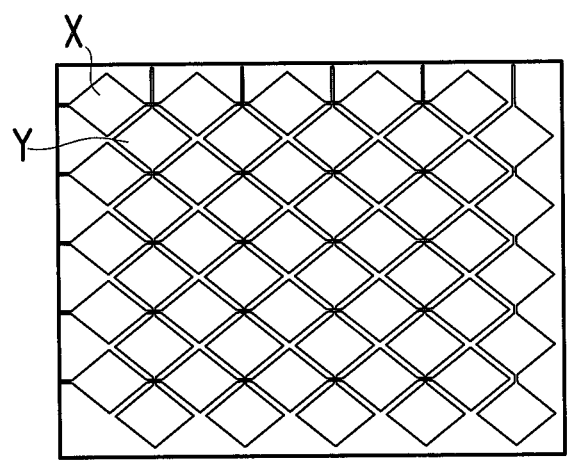
FIG. 7 and FIG. 8 are schematic views illustrating a first touch region of a touch electrode layer according to other embodiments of the invention.
Figure 8:
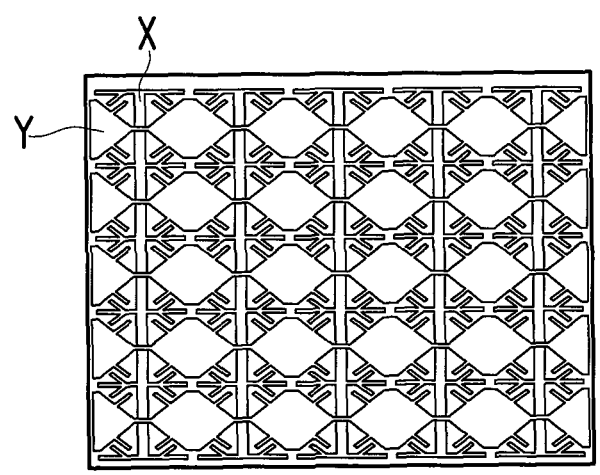

With reference to FIG. 4, according to an embodiment of the invention, the touch device layer 114 in the first touch region TP1 includes a plurality of first touch series X and a plurality of second touch series Y. In particular, the first touch series X are touch electrode patterns extending along an X direction, and the second touch series y are touch electrode patterns extending along a Y direction. There is a dielectric layer between the first touch series X and the second touch series Y, and the dielectric layer serves to isolate the first touch series X from the second touch series Y. On account of the design of the first and second touch series X and Y, the position where a user touches can be determined. It should be mentioned that the electrode patterns of the first and second touch series X and Y are not limited to those shown in FIG. 4, i.e., the electrode patterns of the first and second touch series X and Y are not limited to be in a bar shape. According to another embodiment shown in FIG. 7, the touch device layer 114 in the first touch region TP1 includes a plurality of first touch series X and a plurality of touch series Y, and the touch electrode patterns of each first touch series X and each second touch series Y may be exemplarily shaped as quadrangles or rhombi. However, the invention is not limited thereto. Alternatively, as indicated in FIG. 8, the touch device layer 114 in the first touch region TP1 includes a plurality of first touch series X and a plurality of touch series Y, and the touch electrode patterns of each first touch series X and each second touch series Y not only have main line sections shaped as bars but also have branches connected to the bar-shaped main line sections. For instance, the touch electrode patterns of each first touch series X and each second touch series Y may be exemplarily shaped as quadrangles or rhombi, which should however not be construed as a limitation to the invention. Namely, the touch electrode patterns of the first and second touch series X and Y may be shaped as polygons or arcs, or the touch electrode patterns may have a shape combining said two shapes or may be shaped in any other manner. Moreover, the touch device layer 114 described in the present embodiment is a capacitive touch device layer, for instance, while the invention is not limited thereto. In other embodiments, the touch device layer 114 may have other structures known to people having ordinary skill in the art pertinent to the touch sensing technology, e.g., the touch device layer may be a resistant touch device layer, an optical touch device layer, a sonic wave touch device layer, or the touch device layer may have a structure combining said two touch structures or any other appropriate structure.

Figure 6:
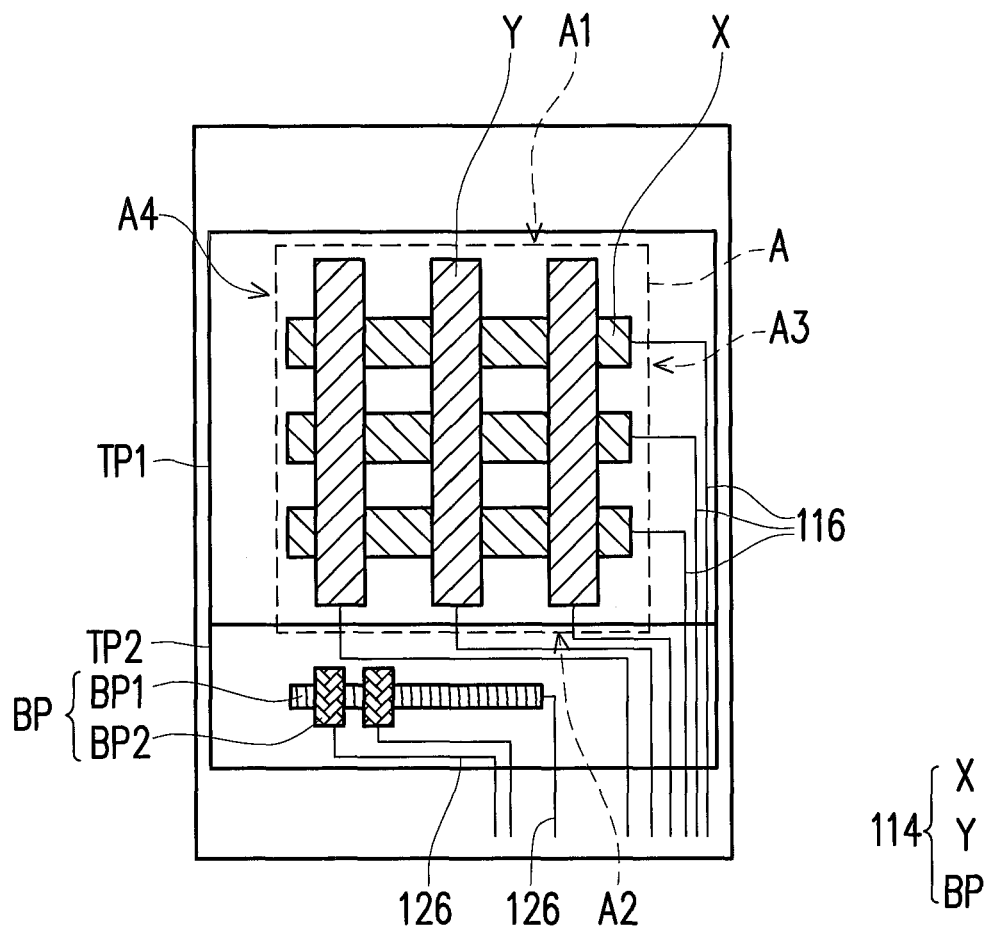
FIG. 6 is a schematic view illustrating components on a second substrate of a touch display panel according to an embodiment of the invention.

From another aspect, the touch device layer 114 in the second touch region TP2 includes at least one touch key BP separated from the touch device layer 114 in the first touch region TP1. That is to say, the first touch series X and the second touch series Y in the first touch region TP1 are separated and electrically insulated from the touch key BP in the second touch region TP2. In the present embodiment, the touch key BP may be designed to have certain functions, e.g., the touch key BP may serve to power on or power off a device or return a user to the last state that an application having certain functions was in. Further, the shape of the touch key BP of the touch device layer 114 in the second touch region TP2 is not limited to be the rectangle as shown in FIG. 4. Besides, an insulation layer may be selectively located above the touch key BP of the touch device layer 114 in the second touch region TP2. In another embodiment, the touch device layer 114 in the second touch region TP2 may include stacked touch keys BP1 and BP2, as indicated in FIG. 6, and an insulation layer is disposed between the touch key BP1 and the touch key BP2 to separate the two touch keys BP1 and BP2. Here, the shape of the touch keys BP1 and BP2 is not limited to be a rectangle or a bar. Namely, the shape of touch pads of the touch device layer 114 in the second touch region TP2 is not limited in the invention, i.e., the touch pads may be shaped as polygons or arcs, or the touch pads may be in a shape combining said two shapes or may be shaped in any other manner.

As stated above, the touch device layer 114 in the first touch region TP1 is made of substantially the same material as that of the touch device layer 114 in the second touch region TP2. In the present embodiment, a material of the touch device layer 114 includes a transparent conductive material, e.g., indium tin oxide (ITO), indium zinc oxide (IZO), aluminum tin oxide (ATO), aluminum zinc oxide (AZO), indium gallium zinc oxide (IGZO), other suitable oxide, or a stacked layer having at least two of the above-mentioned materials. Besides, the touch device layer 114 in the first and second touch regions TP1 and TP2 may be defined in the same manufacturing process with use of the same photomask. For instance, the touch key BP or BP1 in the second touch region TP2 may be defined together with the first touch series X in the first touch region TP1, or the touch key BP or BP2 in the second touch region TP2 may be defined together with the second touch series Y in the first touch region TP1. Undoubtedly, the touch device layer 114 in the first and second touch regions TP1 and TP2 may be defined in the same manufacturing process with use of the same photomask or in different manufacturing processes with use of different photomasks. In other embodiments of the invention, the touch device layer 114 in the first and second touch regions TP1 and TP2 may be formed by performing a screen printing process, an inkjet process, or any other appropriate process.

The second lead lines 116 are located on the second substrate 112 and electrically connected to the touch device layer 114, and the second lead lines 116 extend from the first touch region TP1 to an edge of the second substrate 112 through the second touch region TP2. After the second lead lines 116 extend to the edge of the second substrate 112, the extended second lead lines 116 are electrically connected to the second circuit board C2. In the present embodiment, a driving chip or a driving device may be further disposed between the second lead lines 116 and the second circuit board C2, i.e., the second lead lines 116 are electrically connected to the second circuit board C2 through a driving chip or a driving device. Namely, a driving chip or a driving device may be selectively disposed on the second substrate 112 or on the second circuit board C2.

As described above, with reference to FIG. 3 and FIG. 4, the first lead lines 106 electrically connected to the pixel array 104 and the second lead lines 116 electrically connected to the touch device layer 114 are respectively located in the non-display region B corresponding to or adjacent to two opposite sides of the display region A according to the present embodiment. In particular, the display region A described herein has a first side A1, a second side A2, a third side A3, and a fourth side A4. The first and second sides A1 and A2 are opposite to each other and are not adjacent to each other, and the third and fourth sides A3 and A4 are opposite to each other and are not adjacent to each other. On the other hand, the non-display region B includes a first region BR1 adjacent to the first side A1 of the display region A and a second region BR2 adjacent to the second side A2 of the display region A. Hence, in the present embodiment, the first lead lines 106 are located in the first region BR1 of the non-display region B, and the second lead lines 116 are located in the second region BR2 of the non-display region B. The first lead lines 106 extend toward the upper portion of the drawings, and the second lead lines 106 extend toward the lower portion of the drawings.

The touch display panel described in the present embodiment further includes a plurality of third lead lines 126, and an end of each third lead line 126 is electrically connected to the touch device layer 114 in the second touch region TP2. Namely, the third lead lines 126 are electrically connected to the touch key BP (exemplarily shown in FIG. 4 and FIG. 6) in the second touch region TP2. The other end of each third lead line 126 also extends to the edge of the second substrate 112 and is electrically connected to the second circuit board C2. In the present embodiment, a driving chip or a driving device may be further disposed between the third lead lines 126 and the second circuit board C2, i.e., the third lead lines 126 are electrically connected to the second circuit board C2 through a driving chip or a driving device. Namely, a driving chip or a driving device may be selectively disposed on the second substrate 112 or on the second circuit board C2. The driving chip or the driving device connected to the third lead lines 126 may be the same as or different from the driving chip or the driving device connected to the second lead lines 116 based on the design demands. Note that the third lead lines 126 are separated from the second lead lines 116, and the third lead lines 126 are connected to the touch key BP in the second touch region TP2 but are not connected to the first and second touch series X and Y in the first touch region TP1, as exemplarily shown in FIG. 4 and FIG. 6. Besides, the second lead lines 116 are connected to the first and second touch series X and Y in the first touch region TP1 but are not connected to the touch key BP in the second touch region TP2, as exemplarily shown in FIG. 4 and FIG. 6.

In consideration of electrical conductivity, the first, second, and third lead lines 106, 116, and 126 are normally made of metal materials, such as gold, silver, copper, aluminum, tin, tungsten, molybdenum, titanium, tantalum, neodymium, or any other appropriate material. However, the first, second, and third lead lines 106, 116, and 126 may also be made of other conductive materials in other embodiments, which should not be construed as a limitation to the invention. The conductive material includes transparent metal oxide, an alloy, metal nitride, metal oxynitride, another appropriate material, or a layer in which the metal materials are stacked, or a layer in which metal and other conductive materials are stacked.

The display medium layer 118 is located between the first substrate 102 and the second substrate 112. The display medium layer 118 includes a liquid crystal display medium, an organic electroluminescent display medium, an electrophoretic display medium, an electrowetting display medium, an inorganic electroluminescent display medium, any other applicable display medium, or a combination thereof. A color filter layer (not shown) and/or an electrode layer (not shown) may be further disposed between the display medium layer 118 and the touch device layer 114, which may be determined by the type of the display panel. For instance, given that the touch display panel described herein is an LCD panel with the touch sensing function, the LCD panel may further include a color filter layer and an electrode layer disposed between the first substrate 102 and the second substrate 112. By contrast, given that the touch display panel described herein is an organic electroluminescent display panel with the touch sensing function, the organic electroluminescent display panel may further include an electrode layer (anode or cathode) and a planarization layer (not shown) disposed between the first substrate 102 and the second substrate 112.

Moreover, the touch display panel in the present embodiment may further include a sealant 120 disposed between the first substrate 102 and the second substrate 112. The sealant 120 can isolate the display medium layer 118 from the external surroundings.

Figure 5:
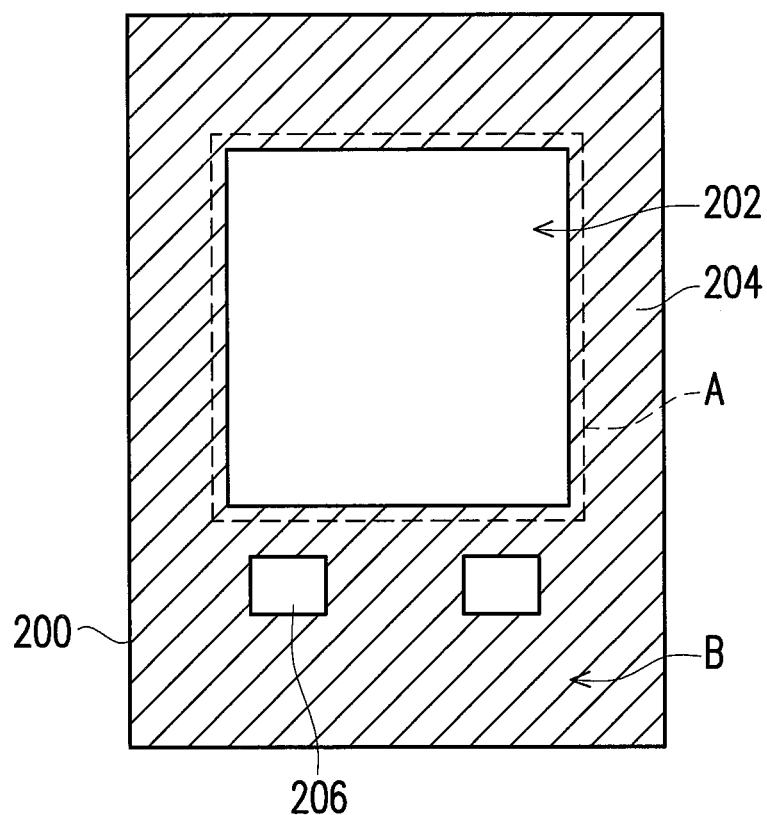
FIG. 5 is a schematic view illustrating a covering substrate above a touch display panel according to an embodiment of the invention.

Moreover, the touch display panel described in the present embodiment may include a covering substrate 200. The covering substrate 200 is located above and covers the second substrate 112. Specifically, the covering substrate 200 has a transparent region 202 and a non-transparent region 204, the transparent region 202 corresponds to the display region A, and the non-transparent region 204 corresponds to the non-display region B. Particularly, a non-transparent material is disposed on a certain area of a transparent substrate to form the transparent region 202 and the non-transparent region 204 of the covering substrate 200. Alternatively, the covering substrate 200 is made of a transparent substrate and a non-transparent substrate, the transparent region of the entire covering substrate 200 is composed of the transparent substrate, and the non-transparent region of the entire covering substrate 200 is composed of the non-transparent substrate. Besides, the covering substrate 200 has at least one transparent pattern 206 corresponding to the touch key BP, as shown in FIG. 5. The transparent patterns 206 may be designed to have certain shape corresponding to the function of the touch keys BP. For instance, the transparent patterns 206 may be shaped as lightning, a power symbol, a house, a mailbox, and so on. In other words, the shape of the transparent patterns 206 may be modified according to the actual design.

Since the transparent region 202 of the covering substrate 200 corresponds to the display region A, a user is allowed to watch images displayed on the touch display panel through the transparent region 202. Additionally, since the first touch region TP1 corresponds to the display region A as well, a user is allowed to watch images displayed on the touch display panel through the transparent region 202 and directly perform the touch sensing function on the images displayed on the display region A. What is more, since the covering substrate 200 has the transparent pattern 206 corresponding to the touch key BP, light of the touch display panel may pass through the transparent patterns 206. Thereby, a user is allowed to perform the touch sensing function by touching the transparent patterns 206 corresponding to the touch keys BP.

In light of the foregoing, the touch device layer includes the first touch region within the display region and the second touch region within the non-display region, and the touch device layer in the first and second touch regions is made of the same material. That is, in an embodiment of the invention, the touch device layer is located in the non-display region where no touch device is supposed to be placed according to the related art, such that touch keys for performing certain functions can be configured in the non-display region where the touch device layer is located according to an embodiment of the invention. As a consequence, the problem of waste of space in the conventional touch display panel can be resolved, and the functions of the touch display panel described herein may be expanded in comparison with the functions of the conventional touch display panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch display panel having a display region and a non-display region, the touch display panel comprising:
   a first substrate;
   a pixel array located on the first substrate and in the display region;
   a plurality of first lead lines located on the first substrate and in the non-display region, the first lead lines being electrically connected to the pixel array;
   a second substrate located opposite to the first substrate;
   a display medium layer located between the first substrate and the second substrate;
   a touch device layer located on the second substrate, the touch device layer having a portion in a first touch region within the display region and the other portion in a second touch region within the non-display region, wherein the other portion of the touch device layer in the second touch region comprises at least one touch key separated from the touch device layer in the first touch region, and the touch device layer in the first touch region and the touch device layer in the second touch region being made of a same material;
   a plurality of second lead lines located on the second substrate and electrically connected to the touch device layer, the second lead lines extending from the first touch region to an edge of the second substrate through the second touch region; and
   a covering substrate, wherein the covering substrate having a transparent region and a non-transparent region, the transparent region corresponding to the display region, the non-transparent region corresponding to the non-display region, wherein the covering substrate has a transparent pattern corresponding to the at least one touch key.

2. The touch display panel as recited in claim 1, wherein the portion of the touch device layer in the first touch region comprises a plurality of first touch series and a plurality of second touch series.

3. The touch display panel as recited in claim 1, wherein a material of the touch device layer comprises a transparent conductive material.

4. The touch display panel as recited in claim 1, wherein the first lead lines and the second lead lines are respectively located in the non-display region corresponding to two opposite sides of the display region.

5. The touch display panel as recited in claim 4, wherein the display region has a first side, a second side, a third side, and a fourth side, the first and second sides are opposite to each other and are not adjacent to each other, the third and fourth sides are opposite to each other and are not adjacent to each other, the non-display region includes a first region adjacent to the first side of the display region and a second region adjacent to the second side of the display region, the first lead lines are located in the first region of the non-display region, and the second lead lines are located in the second region of the non-display region.

6. The touch display panel as recited in claim 1, further comprising a plurality of third lead lines, the third lead lines being electrically connected to the touch device layer in the second touch region, the second lead lines being electrically connected to the touch device layer in the first touch region.

7. The touch display panel as recited in claim 1, wherein the pixel array comprises:
   a plurality of scan lines and a plurality of data lines;
   a plurality of active devices electrically connected to the scan lines and the data lines; and
   a plurality of pixel electrodes electrically connected to the active devices,
   wherein parts of the first lead lines are electrically connected to the scan lines, and the other parts of the first lead lines are electrically connected to the data lines.

8. The touch display panel as recited in claim 1, further comprising:
   a first circuit board located on the first substrate and electrically connected to the first lead lines; and
   a second circuit board located on the second substrate and electrically connected to the second lead lines.

* * * * *